United States Patent [19]

Wolf

[11] Patent Number: 5,781,591

[45] Date of Patent: Jul. 14, 1998

[54] DIGITAL METHOD FOR DETECTING PULSES OF SHORT DURATION AND ARRANGEMENT FOR IMPLEMENTING THE METHOD

[75] Inventor: Günther Wolf, Neu-Ulm, Germany

[73] Assignee: Daimler-Benz Aerospace AG, Munich, Germany

[21] Appl. No.: 758,433

[22] Filed: Nov. 29, 1996

[30] Foreign Application Priority Data

Dec. 2, 1995 [DE] Germany ............ 195 45 022.1

[51] Int. Cl.$^6$ ............ H04L 27/06; G01R 23/06; H03K 9/02
[52] U.S. Cl. ............ 375/342; 375/340; 375/353
[58] Field of Search ............ 375/238, 239, 375/340, 342, 353

[56] References Cited

U.S. PATENT DOCUMENTS

| 3,670,251 | 6/1972 | Shintani et al. ......... 375/340 X |
|---|---|---|
| 4,242,755 | 12/1980 | Gauzan ............ 375/342 X |
| 5,119,400 | 6/1992 | Koch ............ 375/341 X |
| 5,134,632 | 7/1992 | Fletcher et al. ............ 375/238 |
| 5,351,271 | 9/1994 | Coquerel ............ 375/340 X |
| 5,390,213 | 2/1995 | O'Donnell ............ 375/239 |
| 5,471,507 | 11/1995 | Awata et al. ............ 375/340 |

FOREIGN PATENT DOCUMENTS 43 44 022 A1   6/1995   Germany .

Primary Examiner—Young T. Tse
Attorney, Agent, or Firm—Spencer & Frank

[57] ABSTRACT

A digital method for detecting pulses of short duration. During this process, a threshold value is formed using FIR filters with the assistance of a detection method similar to one in radar technology, by means of which threshold value short pulses to be detected can be distinguished from, in contrast, long pulses. The cut-off length of the pulses to be detected can be set in further ranges by way of simple parameter changes in the circuit. An arrangement for implementing the method is also disclosed.

10 Claims, 2 Drawing Sheets

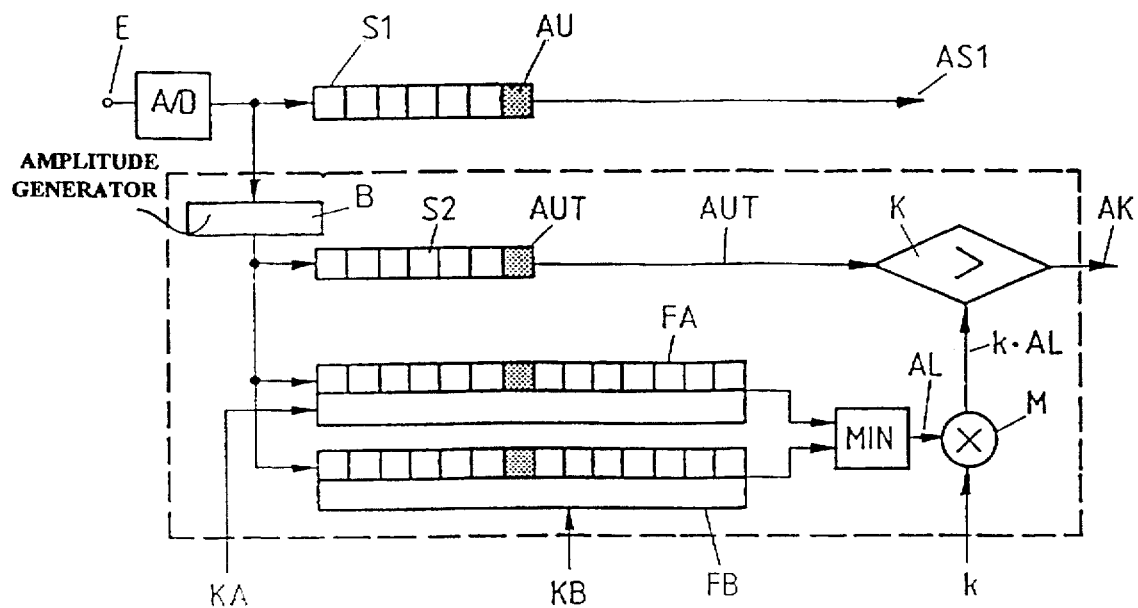
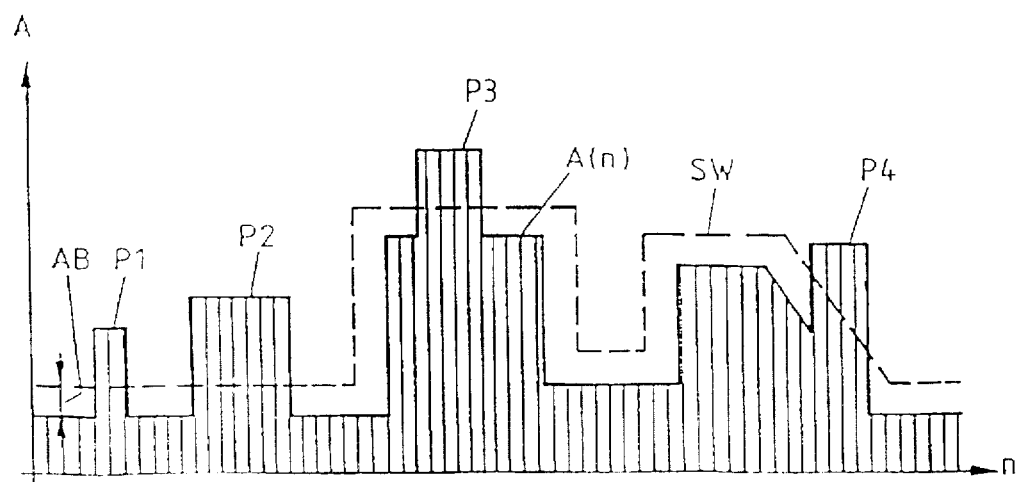
FIG. 2A

5,781,591

DIGITAL METHOD FOR DETECTING PULSES OF SHORT DURATION AND ARRANGEMENT FOR IMPLEMENTING THE METHOD

REFERENCE TO RELATED APPLICATIONS

This application claims the priority of German application Ser. No. 19545022.1, filed Dec. 2, 1995, which is incorporated herein by reference.

BACKGROUND OF THE INVENTION

The invention is directed to a digital method for detecting pulses of short duration and to an arrangement for implementing the method. More particularly, the present invention relates to a digital method for detecting pulses of short duration, wherein an input signal is present as a result of clocked samples, each sample of the input signal is examined to determine whether the sample belongs to a pulse to be detected, and only those pulses are detected whose pulse length is smaller than an associated predetermined pulse length threshold value and whose pulse height or amplitude is larger than an associated predetermined amplitude threshold value.

In communications engineering, particularly in radar technology, it is necessary in many cases to detect, that is, to recognize and/or to mark short pulses having a certain length variation. During this method, the short pulses are supposed to be recognized reliably even at a signal-to-noise ratio (S/N ratio) which is as small as possible and/or in the presence of pulses of long duration.

For a detection of this type it is obvious to use a high-pass filter with a suitably selected low-frequency cut-off as well as a downstream threshold circuit, e. g., for suppressing the amplitude noise.

A drawback is that, in such a method, it is only possible to change the cut-off frequency, or critical frequency, and the threshold value through a high degree of technical complexity, particularly if these values must be changed quickly and within a wide range.

This drawback can be avoided with a filter bank comprising a plurality of individual filters, respectively having a fixedly set cut-off frequency, as well as with a controlled threshold value switch with associated control circuit. However, such a method is also not advantageous because of its technical complexity and it is therefore not economical.

Furthermore, from DE-A-43 44 022, a method is known wherein a threshold value is formed by way of a so-called ordered statistics method. This threshold value allows an extensive matching to a time-dependent amplitude (value) signal which is heterodyned or superposed by pulses of short duration which are to be detected.

It is the object of the invention to provide a further method of the generic type which allows good and fast matching to short pulses that are to be detected.

Furthermore, it is the object of the invention to propose an arrangement for implementing such a method.

SUMMARY OF THE INVENTION

The above object regarding the method is accomplished by a digital method for detecting pulses of short duration, comprising the following steps of: providing an input signal which is comprised of clocked samples; examining each sample of the input signal to determine whether the sample belongs to a pulse to be detected; and detecting only those pulses whose pulse length is smaller than an associated predetermined pulse length threshold value and whose pulse height is larger than an associated predetermined amplitude threshold value, with the step of detecting including: generating amplitude values (A(n)) associated with the samples, by use of an amplitude generation; supplying the generated amplitude values to at least one FIR filter having a predetermined number of filter stages; setting a window mask having a predetermined width as well as a frame mask in the at least one FIR filter, using at least one set of filter coefficients with the frame mask surrounding the window mask but not overlapping it; passing the amplitude values (A(n)) through the frame mask and the window mask at the same time; for an amplitude value under test (AUT), to which a predetermined position is allocated within the window mask, determining an amplitude value magnitude (AL) by a minimum selection (MIN) between the frame masked value and the window masked value provided by the at least one FIR filter; multiplying the determined amplitude value magnitude (AL) by a predetermined weighting factor (k) to form an amplitude threshold value (SW); and, marking all samples whose amplitude is larger than the threshold value (SW).

According to the preferred embodiment of the method according to the invention, the step of supplying the generated amplitude values further includes supplying the amplitude values simultaneously to two FIR filters each of which has a predetermined number of filter stages; and the step of setting includes setting the window mask in one of the FIR filters and the frame mask in the other of the FIR filters using respective sets of coefficients.

According to features of the method according to the invention, the sets of coefficients are selected such that the predetermined width of the window mask, measured in filter stages (cycles), is smaller than the maximum usable window length ($R_{inside}$) of the frame mask, and the window mask is centered with respect to the maximum usable window length ($R_{inside}$). Moreover, the maximum usable window length ($R_{inside}$) is selected according to the formula $$1 \leq P \leq 2 \cdot R_{inside},$$

with P being the pulse length of the pulses to be detected which is measured in cycles; and for the formation of the threshold value (SW), the method further includes: storing a predetermined number of amplitude values and evaluating the stored values continuously in time in at least one FIR filter; simultaneously storing the amplitude values continuously in time in a clocked delay line; and, selecting an amplitude value under test (AUT) having a storage location in the delay line which is disposed within the window mask of the FIR filter, and preferably essentially disposed in the center of the window mask of the FIR filter.

The above objects likewise are achieved according to the invention by a circuit arrangement which comprises: a clocked first delay line for receiving the input signal; an amplitude value generator connected to receive the input signal and generating amplitude values corresponding to the samples of the input signal; a clocked second delay line and first and second FIR filters connected to a receive the amplitude values; each of the FIR filters having a respective set of coefficients such that a window mask having a predetermined width is set in the first FIR filter and a frame mask is set in the second FIR filter, with the frame mask surrounding the window mask but not overlapping it; each of the clocked delay lines being a respective shift register which has a number of stages which is less than the number of respective stages of the FIR filters and is selected such that an amplitude value under test (AUT) can be selected within the range of the window mask of the first FIR filter; circuit means connected to respective outputs of the first and second FIR filters for selecting a minimum value between a frame masked output value from the second FIR filter and a window masked output value from the first FIR filter, to provide an amplitude value magnitude signal; a multiplier connected to the circuit means to receive the amplitude value magnitude signal and to multiply the amplitude value magnitude signal by a predetermined weighting factor to form an amplitude threshold value; and a comparator which compares the amplitude threshold value with the output signal of the second shift register, which output signal corresponds to the sample under test, and produces a flag output signal if the output signal of the second shift register is larger than the amplitude threshold value.

Preferably, the number of stages within each FIR filter is at least twice as large as the number of stages of the second delay line.

Advantageous features and/or modifications can be taken from the dependent claims.

A first advantage of the invention is that the method allows the simultaneous detection of short pulses of different lengths by using of one and the same setting.

A second advantage of the invention is that essentially electronic building blocks and/or modules are used which are controlled by a cycle. Matching to the pulse length to be detected is possible within a wide range by changing the clock frequency.

A third advantage is that the transient times, which otherwise occur with a high-pass filter, occur less frequently, thus allowing a faster change and/or matching to changing parameters, e. g., abruptly changing amplitude noise.

A fourth advantage is that the threshold value is matched automatically within wide limits to the changing amplitude values of the noise.

A fifth advantage is that the circuit arrangement can be implemented in integrated technology with a small number of modules so that a light, mechanically robust, reliable as well as economical arrangement is possible.

Further advantages will be apparent from the description which follows.

The invention is based on using at least two FIR ("finite impulse response") filters which are known per se. A FIR filter is illustrated schematically in FIG. 3. In such a filter, impulses Si, which are equidistant in time and applied to an input, for example, samples generated by an analog to digital converter with a following amplitude generator, are supplied to a series connection comprised of delay elements d which are identical per se. These delay elements respectively delay an applied signal (pulse) by one clock period, for example, the clock period with which the samples are generated. The non-delayed pulse and the delayed pulses forming after every delay element d each are supplied to an input of a respective multiplier MF. The respectively other input of each of the multipliers MF is supplied with a respective predetermined coefficient h(0) to h(n−1), with n being the number of stages of the FIR filter. The desired characteristic of the FIR filter can be set by the coefficients h(0) to h(n−1). The output signals of the multipliers MF are supplied to a common summing element SU at whose output the output signal Yi of the FIR filter is formed.

Such FIR filters are used, for example, in radar technology for the so-called CFAR ("Constant False Alarm Rate") method.

Surprisingly, it is now possible with such FIR filters to design a detector for pulses with predeterminable maximum pulse length. Here, the pulse length is defined in units of a cycle, for example, of the one with which the samples of an analog to digital converter are generated.

BRIEF DESCRIPTION OF THE DRAWINGS

In the following, the invention is explained in greater detail by way of an embodiment with reference to schematically illustrated additional figures, wherein FIG. 1 is a block circuit diagram of an embodiment of an arrangement according to the invention;

FIGS. 2A to 2C and FIG. 4 are diagrams used to explain the invention; and

DETAILED DESCRIPTION OF THE PREFERRED EMBODIMENT

Figure 2B:
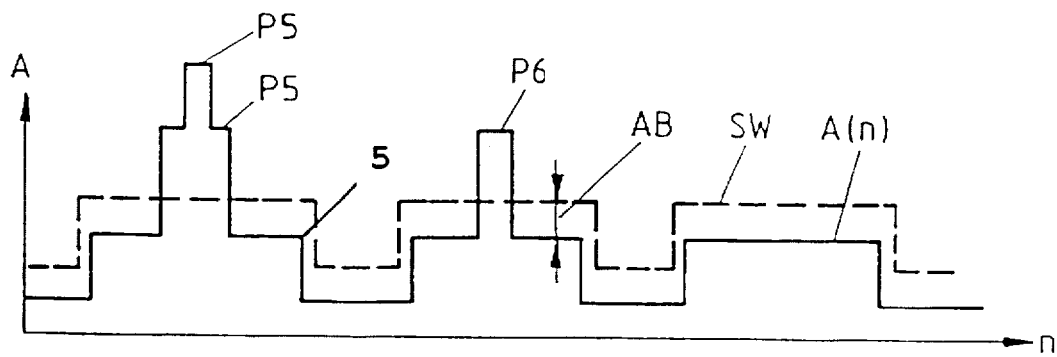

FIG. 1 shows a schematically illustrated circuit arrangement according to the invention, with a complex analog input signal being applied to the input E of an analog to digital converter A/D. At the output of the analog to digital converter A/D, an associated digitally sampled complex-valued input signal is generated, which preferably consists of samples that are equidistant in time. Here, the (scanning) cycle is selected according to the sampling theorem. This digital input signal reaches a clocked first shift register S1 which is designed to have 7 stages merely for purposes of the drawing and which merely acts as a clocked delay line. In the first shift register S1, a so-called signal under test AU is present in the shift register's last storage cell, i.e., the seventh stage.

The same output signal is present simultaneously at the output, the first output AS1, of the first shift register S1. With regard to this signal under test AU, an examination is intended to determine whether this signal belongs to a short pulse which can extend over several digital samples. This examination is carried out with a circuit arrangement which is framed in the drawing by a broken line.

In accordance with FIG. 1, the complex-valued, digital input signal is first fed to an amplitude generator B whose output is connected to the input of a second shift register S2 and with the inputs of two FIR filters FA and FB. The second shift register S2 has the same number of stages, in this case seven, as the first shift register S1, and also serves merely as a clocked delay element. The output of the second shift register S2 is connected to a first input of a comparator K, with the amplitude signal AUT of the second shift register S2 corresponding to the signal under test AU present at the output of the first shift register S1.

Preferably but not necessarily, the FIR filters FA, FB have the same design; this will be explained in greater detail further below. The number of stages in the FIR filters FA, FB (fourteen in the illustrated embodiment) is larger than that of the shift registers S1, S2 and preferably twice as large. The FIR filters FA, FB have respective different sets of coefficients KA, KB which are predetermined and set via associated control lines according to a predeterminable parameterization; this likewise will be explained below in greater detail. The clocked output signals of the FIR filters FA, FB are supplied to the respective inputs of a comparator MIN which determines the respectively smaller signal (minimum) AL, also identified as the amplitude value magnitude. This signal AL is supplied to a first input of a multiplier M. To the second input of the multiplier M is supplied a predetermined threshold value multiplier signal k (weighting factor). The output signal k·AL (amplitude threshold value) of the multiplier M is supplied to a second input of the comparator K. The comparator K determines whether the (output amplitude) signal AUT (first input) is larger than the signal k·AL (second input). If this is the case, a flag signal is generated at the comparator output AK to identify a desired pulse. This output flag signal AK and the output signal AU of the first shift register S1 are present simultaneously at the outputs AK and AS1. Here, a pulse that is to be detected may be comprised of several samples. The signal k·AL corresponds to an (amplitude) threshold value SW whose course over time is shown by a broken line in FIG. 2A; this will be explained below in greater detail.

FIG. 2A shows an exemplary amplitude input signal which is present at to the output of the amplitude generator B (FIG. 1). Here, the amplitude value A is plotted as a function of the number n of the sample. Since the samples are determined equidistantly in time, the abscissa can also be regarded as a time axis. The amplitude response A(n), which is a function of the digital time n, can be interpreted as heterodyning or the superposition of noise and/or pulses of long duration with pulses of short and medium length duration P1 to P4 which are to be detected.

Surprisingly, it is now possible to select the parameterization (sets of coefficients KA, KB, threshold value multiplier k) such that the course over time of the threshold value signal SW=k·AL has the course shown by a broken line. The latter course is characterized by the fact that a determinable and settable distance AB is kept with respect to the noise and to the long pulses and that the course over time of the threshold amplitude signal SW corresponds to that of the noise and of the long pulses. With such a threshold value signal SW, the short pulses P1 and the medium-length pulses P2 to P4 can be detected reliably in that an associated flag signal AK is generated for each sample under test AU at the output of comparator K. This indicates whether or not the sample under test AU applied to the output AS1 belongs to a short pulse P1 to P4 to be detected.

Corresponding to the selected parameterization (sets of coefficients KA, KB, threshold value multiplier k), it is possible to vary the length of the useful pulses to be detected within wide ranges.

Figure 2C:
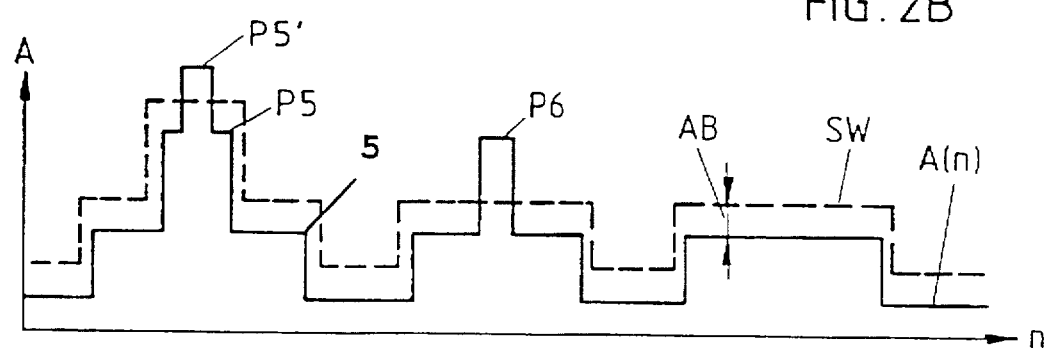

This is explained in greater detail by way of the FIGS. 2B and 2C, whose representations corresponds to that of FIG. 2A.

FIGS. 2B and 2C respectively illustrate the same time domain diagram of the samples A(n). This diagrams comprises the pulses P5, P5' as well as P6. The pulse P5' is of shorter duration than pulse P5. Pulses P5, P5' are shorter than pulse 5. Here, pulses P5, P5' are heterodyned or superposed, that is, they appear simultaneously.

According to FIG. 2B, the threshold value SW is now selected on the basis of a first parameterization A such that all "short" pulses (useful pulses) P5, P5' as well as P6 are detected.

In contrast, according to FIG. 2C, the threshold value SW is selected on the basis of a second parameterization B such that only particularly short pulses, namely the pulses P5', P6 are detected. The pulse P5 is suppressed.

Such different methods of selection of the threshold value SW according to FIG. 2A to 2C are possible because of a corresponding selection of the sets of coefficients KA (for FIR filter FA) and KB (for FIR filter FB). Here, the sets of coefficients KA, KB can be regarded as complementing each other to a certain extent; this is explained in greater detail by way of FIG. 4.

Figure 3:
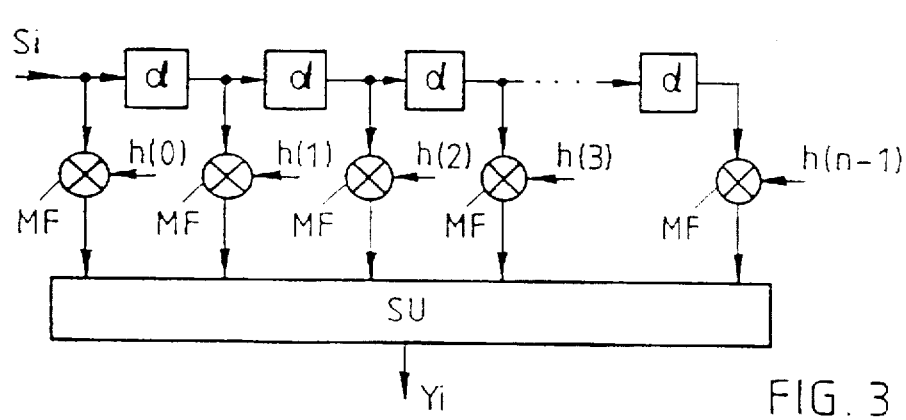
FIG. 3 is a schematic circuit diagram of a FIR filter.
Figure 4:
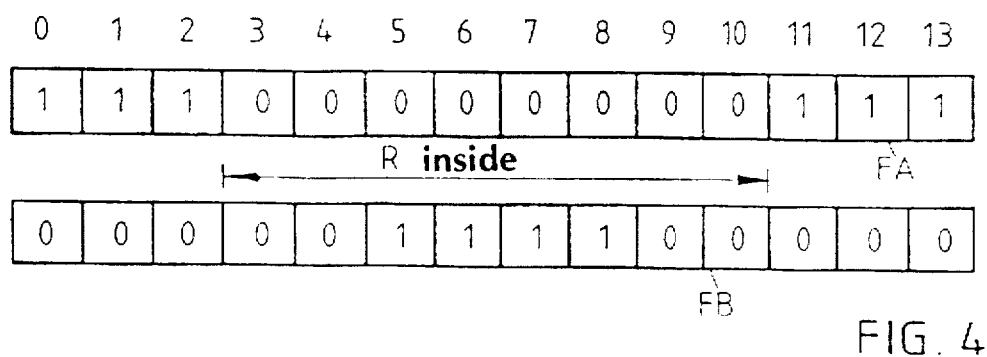

FIG. 4 shows a schematic representation of the FIR filters FA, FB according to FIG. 1 which, by way of example, are assumed to have fourteen stages. The stages are numbered from 0 to 13. In both FIR filters FA, FB, the signal under test AUT, which is illustrated by cross hatching in FIG. 1, is disposed in stage no. 6 of each FIR filter. As shown in FIG. 3, each stage is associated with a filter coefficient, namely coefficient h0 is associated with stage no. 0, coefficient h1 with stage no. 1, and so on. The coefficients that are respectively associated with an FIR filter are identified as a set of coefficients KA, KB (FIG. 1).

In the following, it is assumed that the coefficients are normalized, namely with respect to all coefficients that are not equal to zero within a FIR filter. If a filter comprises, for example, fourteen stages and if only eight coefficients are not equal to zero, then the coefficient $\frac{1}{8}=0.125$ that is actually to be set, which might also be identified as a unit multiplication factor, corresponds to the normalized coefficient 1 in this FIR filter.

In FIG. 4, associated normalized coefficients, selected by way of example, are entered in each stage for each FIR filter FA, FB. This means that the FIR filters FA, FB (FIG. 1) are associated with the sets of coefficients KA, KB, selected by way of example with

KA: 1 1 1 0 0 0 0 0 0 0 0 1 1 1

KB: 0 0 0 0 0 1 1 1 1 0 0 0 0 0.

This illustration shows clearly that the (normalized) coefficients of the first FIR filter FA represent a so-called outer frame or frame mask relative to the (normalized) coefficients of the second FIR filter FB, with the two sets of coefficients having the following characteristics the "1" coefficients (coefficients not equal to zero) in the two FIR filters FA, FB must not overlap, the "0" coefficients (coefficients equal to zero) in both filters may overlap (stages no. 3, 4, 9, 10 in FIG. 4), preferably, the "1" coefficients of the second FIR filter FB are arranged so as to be centered relative to the "1" coefficients (frame) of the first FIR filter FA.

The (coefficient) frame of the first FIR filter FA thus surrounds a maximum usable window or window mask which is characterized by a time window length $R_{inside}$. In this example, the latter amounts to eight stages (cycles). The detectable short pulses have a pulse length P with $$1 \leq P \leq 2 \cdot R_{inside}.$$

The normalized coefficients in the two FIR filters may be selected at almost any magnitude corresponding to the short pulses to be detected, that is, the coefficients may be positive real numbers of almost any magnitude. In this manner, it is possible, for example, to amplify a short pulse disposed within the window (coefficients of the second FIR filter FB are larger than 1) and to attenuate the (time) environment of the pulse (coefficients of the first FIR filter FA are smaller than 1) at the same time.

The above-mentioned parameters k, KA, KB, the number of the storage cells in the shift registers S1, S2, the number of stages of the FIR filters as well as the clock frequency used for these stages can be matched, e. g., by way of experiment to an input signal to be expected, e. g., a radar signal in the baseband (video range).

Such a detector for short pulses, also identified as SPD (short pulse detector), can be used in many areas of communications engineering, for example, in radar technology for target recognition (short pulse P with variable length) in the vicinity of clutter.

It is obvious that such a detector can be matched quickly to changing situations (input signals, short pulses to be detected) in a more advantageous manner because, for this purpose, only the parameterization (FIG. 2A to 2C) needs to be changed. During this process, for example, predetermined parameterizations can be used which are stored and which can therefore be called up quickly, for example, in changing clutter situations.

The invention is not limited to the embodiment described but, analogously, it can be applied to further embodiments, e. g., for detecting interference pulses that are short but variable in length (so-called glitches) in a pulse sequence whose (useful) pulses must then be considered as long pulses.

Such exemplary applications are listed in the following table:

| short pulse and/or medium-length pulse to be detected | long pulse not to be detected |
|---|---|
| interference pulse | useful pulse |
| target | clutter |
| useful pulse | interference pulse/interference environment |
| foreign pulse | inherent pulse |
| inherent pulse | foreign pulse |

The invention now being fully described, it will be apparent to one of ordinary skill in the art that any changes and modifications can be made thereto without departing from the spirit or scope of the invention as set forth herein.

What is claimed:

1. A digital method for detecting pulses of short duration, comprising the following steps:
  providing an input signal which is comprised of digital samples;
  examining each sample of the input signal to determine whether the sample belongs to a pulse to be detected; and
  detecting only those pulses whose pulse length is smaller than an associated predetermined pulse length threshold value and whose pulse height is larger than an associated predetermined amplitude threshold value, with said step of detecting including;
  generating amplitude values (A(n)) associated with the samples, by an amplitude generator;
  supplying the generated amplitude values to at least one FIR filter having a predetermined number of filter stages;
  setting a window mask having a predetermined width as well as a frame mask in the at least one FIR filter, using at least one set of filter coefficients with the frame mask surrounding the window mask but not overlapping it;
  passing the amplitude values (A(n)) through the frame mask and the window mask at the same time;
  for an amplitude value under test (AUT), to which a predetermined position is allocated within the window mask, determining an amplitude value magnitude (AL) by a minimum comparator (MIN) between the frame masked value and the window masked value provided by the at least one FIR filter,
  multiplying the determined amplitude value magnitude (AL) by a predetermined weighting factor (k) to form an amplitude threshold value (SW); and,
  marking all samples whose amplitude is larger than the amplitude value (SW).

2. A method according to claim 1, wherein: said step of supplying the generated amplitude values further includes supplying the generated amplitude values simultaneously to two FIR filters each of which has a predetermined number of filter stages; and the step of setting includes setting the window mask in one of said FIR filters and the frame mask in the other of said FIR filters using respective sets of coefficients.

3. A method according to claim 2, further comprising selecting the sets of coefficients such that:
  the predetermined width of the window mask, measured in filter stages (cycles), is smaller than the maximum usable window length ($R_{inside}$) of the frame mask; and
  the window mask is centered with respect to the maximum usable window length ($R_{inside}$).

4. A method according to claim 3, including selecting the maximum usable window length ($R_{inside}$) according to the formula $$1 \leq P \leq 2 \cdot R_{inside},$$

with P being the pulse length of the pulses to be detected which is measured in cycles (stages).

5. A method according to claim 3, wherein, for the formation of the amplitude threshold value (SW), said method further includes:
  storing a predetermined number of amplitude values and evaluating the stored values continuously in time in at least one FIR filter;
  simultaneously storing the amplitude values continuously in time in a delay line; and
  selecting as amplitude value under test (AUT) having a storage location in the delay line which is disposed within the window mask of the FIR filter.

6. A method according to claim 5, wherein the storage location for the amplitude value under test (AUT) is selected to be essentially disposed in the center of the window mask of the FIR filter.

7. A method according to claim 5, further comprising:
  supplying the samples to a further delay line;
  in the further delay line, selecting a sample under test (AU) allocated to the associated amplitude value under test (AUT); and,
  said step of marking includes marking the selected sample under test (AU) provided that it is found to belong to a pulse to be detected.

8. An arrangement for implementing the method according to claim 1, comprising:
  a first delay line for receiving the input signal; an amplitude value generator connected to receive the input signal and generating amplitude values corresponding to the sample of the input signal; a second delay line and first and second FIR filters connected to receive the generated amplitude values; each of said FIR filters having a respective set of coefficients such that the window mask having a predetermined width is set in the first FIR filter and the frame mask is set in the second FIR filter, with the frame mask surrounding the window mask but not overlapping it; each of the delay lines being a respective shift resister which has a number of stages which is less than the number of respective stages of said FIR filters and is selected such that the amplitude value under test (AUT) can be selected within the range of the window mask of the first FIR filter; circuit means connected to respective outputs of the first and second FIR filters for selecting a minimum value between a frame masked output value from the second FIR filter and a window masked output value from the first FIR filter, to provide an amplitude value magnitude signal; a multiplier connected to the circuit means to receive the amplitude value magnitude signal and to multiply the amplitude value magnitude signal by the predetermined weighting factor to form the amplitude threshold value; and a comparator which compares the amplitude threshold value with the output signal of the second shift register, which output value corresponds to the amplitude value under test, and which produces a flag output signal if the output signal of the second shift register is larger than the amplitude threshold value.

9. An arrangement according to claim 8, wherein the number of stages within each FIR filter is at least twice as large as the number of stages of the second delay line.

10. An arrangement according to claim 8, wherein the sample under test (AU) selected from the first delay line is applied to a first output; and the flag output signal associated with the sample under test (AU) is sampled synchronously to the output of the comparator provided that the sample under test (AU) belongs to a pulse to be detected and used to mark the sample at the first output.

\* \* \* \* \*